(12) United States Patent
Rowell et al.

(10) Patent No.: US 10,960,924 B2
(45) Date of Patent: Mar. 30, 2021

(54) VEHICLE SYSTEMS FOR ADJUSTING RESISTANCE OR SENSITIVITY OF STEERING WHEELS AND/OR ACCELERATOR PEDALS

(71) Applicant: Toyota Research Institute, Inc., Los Altos, CA (US)

(72) Inventors: Todd J. Rowell, Arlington, MA (US); Michael L. Elkins, Framingham, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 390 days.

(21) Appl. No.: 15/624,769

(22) Filed: Jun. 16, 2017

(65) Prior Publication Data

US 2018/0362076 A1 Dec. 20, 2018

(51) Int. Cl.
| | | |
|---|---|---|
| G08G 1/16 | (2006.01) | |
| B62D 6/00 | (2006.01) | |
| B62D 6/04 | (2006.01) | |
| B62D 5/00 | (2006.01) | |
| B60W 50/16 | (2020.01) | |
| F02D 41/02 | (2006.01) | |
| F02D 11/10 | (2006.01) | |
| F02D 9/02 | (2006.01) | |
| B60K 26/02 | (2006.01) | |

(52) U.S. Cl.
CPC .............. *B62D 6/04* (2013.01); *B60K 26/021* (2013.01); *B60W 50/16* (2013.01); *B62D 5/008* (2013.01); *B62D 6/00* (2013.01); *B62D 6/008* (2013.01); *F02D 9/02* (2013.01); *F02D 11/105* (2013.01); *F02D 41/021* (2013.01); *B60K 26/02* (2013.01); *B60K 2026/022* (2013.01); *B60K 2026/023* (2013.01); *F02D 2200/602* (2013.01); *F02D 2200/70* (2013.01)

(58) Field of Classification Search
CPC combination set(s) only.
See application file for complete search history.

(56) References Cited

U.S. PATENT DOCUMENTS

| | | | |
|---|---|---|---|
| 6,256,561 B1 * | 7/2001 | Asanuma | B62D 1/286 180/197 |
| 6,928,344 B2 * | 8/2005 | McWalter | G07C 5/008 701/33.6 |
| 7,714,701 B2 | 5/2010 | Altan et al. | |
| 8,111,147 B2 | 2/2012 | Litkouhi | |
| 8,428,821 B2 | 4/2013 | Nilsson | |
| 8,781,686 B2 * | 7/2014 | Suzuki | B60W 30/18009 701/42 |

(Continued)

*Primary Examiner* — Adam D Tissot
(74) *Attorney, Agent, or Firm* — Dinsmore & Shohl LLP (57) ABSTRACT

Vehicle systems are disclosed. A vehicle system includes one or more sensors, a steering wheel, an accelerator pedal, a steering wheel actuator, an accelerator pedal actuator, and a controller. The controller is communicatively coupled to the one or more sensors and the steering sensitivity adjusting unit. The controller includes at least one processor and at least one memory module storing computer readable and executable instructions that, when executed by the processor, cause the controller to detect an object based on output from the one or more sensors, and send to the steering sensitivity adjusting unit an instruction for adjusting a sensitivity of the steering wheel in response to detecting the object.

19 Claims, 10 Drawing Sheets

(56) References Cited

U.S. PATENT DOCUMENTS

| | | |
|---|---|---|
| 8,849,515 B2 | 9/2014 | Moshchuk et al. |
| 8,983,724 B2 | 3/2015 | Hauler |
| 9,004,219 B2 | 4/2015 | Rosenmaier et al. |
| 9,061,677 B2 | 6/2015 | Jang |
| 9,290,178 B2* | 3/2016 | Sakima ............... B60W 30/095 |
| 9,475,519 B2 | 10/2016 | Pfeiffer et al. |
| 2002/0091479 A1* | 7/2002 | Maruko .................... B60T 7/22 |
| | | 701/96 |
| 2003/0236608 A1 | 12/2003 | Egami |
| 2007/0244641 A1 | 10/2007 | Altan et al. |
| 2009/0018730 A1* | 1/2009 | Tarasinski ............ A01D 41/127 |
| | | 701/50 |
| 2012/0291587 A1* | 11/2012 | Sakaguchi ........... B60K 26/021 |
| | | 74/513 |
| 2013/0124041 A1* | 5/2013 | Belser ................ B62D 15/0285 |
| | | 701/41 |
| 2016/0001781 A1* | 1/2016 | Fung .................... B60W 40/08 |
| | | 701/36 |
| 2016/0280266 A1* | 9/2016 | Kawamata .......... B60W 10/184 |
| 2017/0015204 A1* | 1/2017 | Oguri ........................ B60L 7/18 |
| 2017/0088174 A1* | 3/2017 | Inoue ................... B60T 8/1755 |
| 2017/0267178 A1* | 9/2017 | Shiga ...................... B60R 11/02 |
| 2017/0341648 A1* | 11/2017 | Sanma .................. B60W 30/14 |

* cited by examiner

VEHICLE SYSTEMS FOR ADJUSTING RESISTANCE OR SENSITIVITY OF STEERING WHEELS AND/OR ACCELERATOR PEDALS

TECHNICAL FIELD

The present specification generally relates to vehicle systems for adjusting resistance or sensitivity of steering wheels and/or accelerator pedals and, more specifically, to vehicle systems that adjust a sensitivity and/or resistance of steering wheels and/or accelerator pedals in response to environmental conditions.

BACKGROUND

Vehicles encounter a variety of driving conditions that may require different amounts of precision in vehicle operation. Accordingly, it may be desirable to adjust a sensitivity and/or a resistance of a steering wheel and/or accelerator pedal based on driving conditions.

SUMMARY

In one embodiment, a vehicle system includes one or more sensors, a steering wheel, an accelerator pedal, a steering wheel actuator, an accelerator pedal actuator, and a controller. The controller is communicatively coupled to the one or more sensors and the steering sensitivity adjusting unit. The controller includes at least one processor and at least one memory module storing computer readable and executable instructions that, when executed by the processor, cause the controller to detect an object based on output from the one or more sensors, and send to the steering sensitivity adjusting unit an instruction for adjusting a sensitivity of the steering wheel in response to detecting the object.

In another embodiment, a vehicle system includes an engine including a throttle valve, one or more sensors, an accelerator pedal, an acceleration sensitivity adjusting unit, and a controller communicatively coupled to the one or more sensors and the acceleration sensitivity adjusting unit. The controller includes at least one processor and at least one memory module storing computer readable and executable instructions that, when executed by the at least one processor, cause the controller to: detect an object based on output from the one or more sensors; and send to the acceleration sensitivity adjusting unit an instruction for adjusting a sensitivity of the accelerator pedal in response to detecting the object.

In yet another embodiment, a vehicle system includes an engine including a throttle valve, one or more sensors, an accelerator pedal, an acceleration resistance adjusting unit, and a controller communicatively coupled to the one or more sensors and the acceleration resistance adjusting unit. The controller includes at least one processor and at least one memory module storing computer readable and executable instructions that, when executed by the at least one processor, cause the controller to: detect an object based on output from the one or more sensors, and send to the acceleration resistance adjusting unit an instruction for adjusting a resistance of the accelerator pedal in response to detecting the object.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
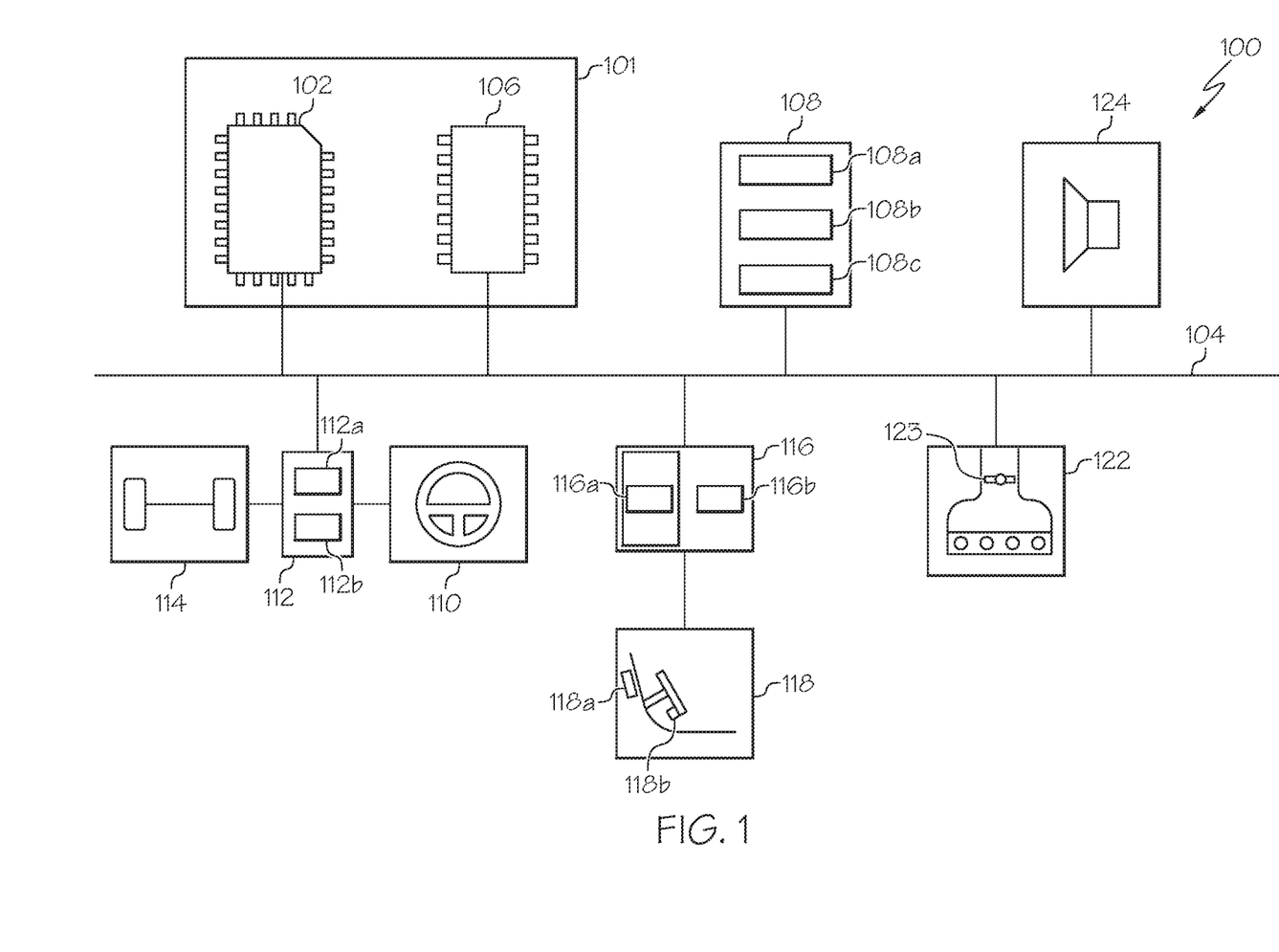
FIG. 1 schematically depicts a schematic vehicle system according to one or more embodiments shown and described herein.

The embodiments disclosed herein include vehicle systems for adjusting resistance or sensitivity of steering wheels and/or accelerator pedals. Referring generally to FIG. 1, a vehicle system includes one or more sensors, a steering wheel, a steering sensitivity adjusting unit, and a controller communicatively coupled to the one or more sensors and the steering sensitivity adjusting unit. The controller includes at least one processor and at least one memory module storing computer readable and executable instructions that, when executed by the at least one processor, cause the controller to: detect an object based on output from the one or more sensors, and send to the steering sensitivity adjusting unit an instruction for adjusting a sensitivity of the steering wheel in response to detecting the object.

Figure 2A:
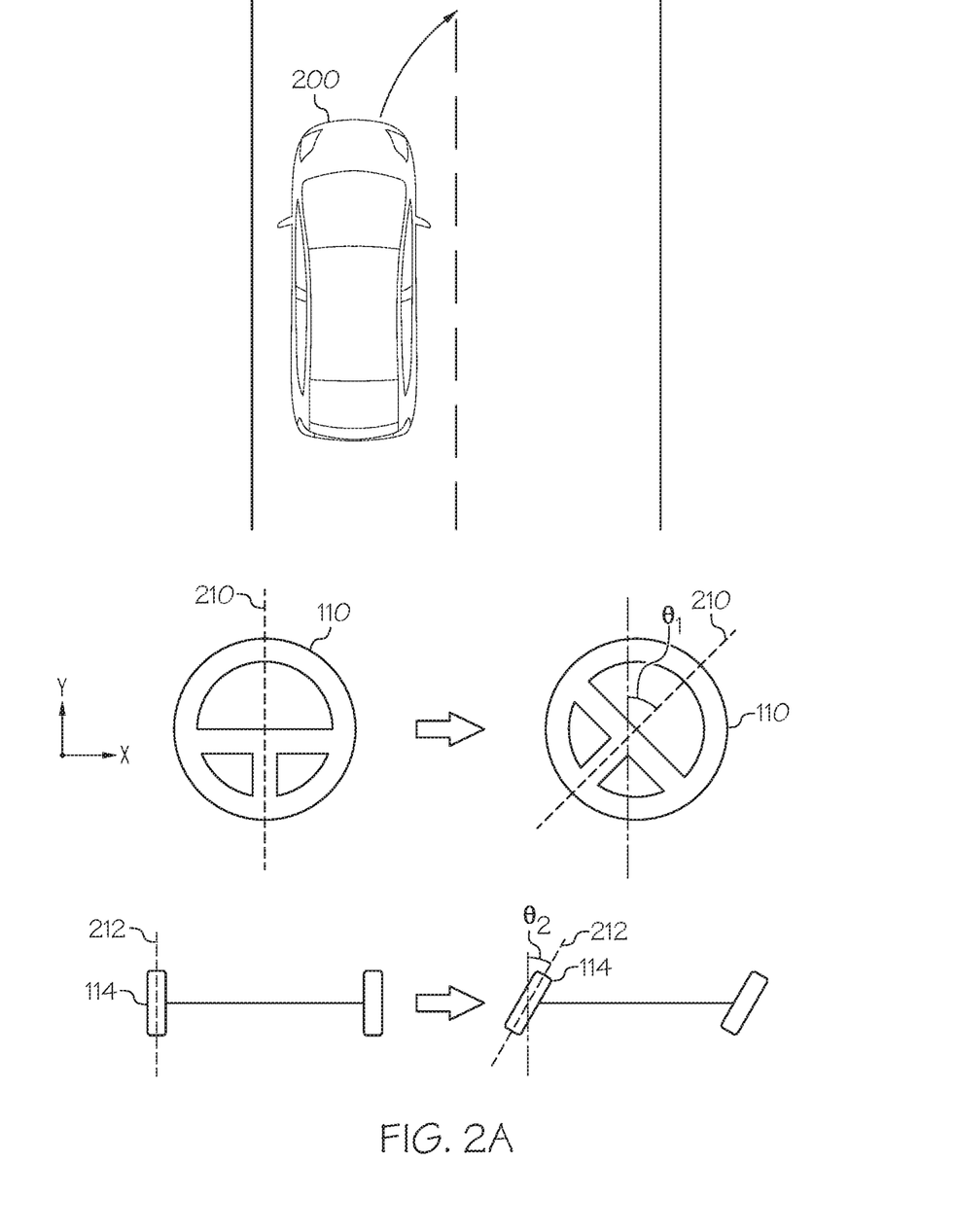
FIGS. 2A and 2B depict adjusting a sensitivity of a steering wheel in accordance with one or more embodiments shown and described herein.

Referring now to FIG. 1, an embodiment of a vehicle system 100 is schematically depicted. It is noted that, while the vehicle system 100 is depicted in isolation, the vehicle system 100 is included within a vehicle (e.g., the vehicle 200 of FIG. 2) in some embodiments. In embodiments in which the vehicle system 100 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the system may be embedded within a mobile device (e.g., smartphone, laptop computer, etc.) carried by a driver of the vehicle.

The vehicle system 100 includes a controller 101 which includes one or more processors 102 and one or more memory modules 106. Each of the one or more processors 102 may be any device capable of executing machine readable and executable instructions. Accordingly, each of the one or more processors 102 may be a controller, an integrated circuit, a microchip, a computer, or any other computing device. The one or more processors 102 are coupled to a communication path 104 that provides signal interconnectivity between various modules of the system. Accordingly, the communication path 104 may communicatively couple any number of processors 102 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, Near Field Communication (NFC) and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 106 are coupled to the communication path 104. The one or more memory modules 106 may comprise RAM, ROM, flash memories, hard drives, or any device capable of storing machine readable and executable instructions such that the machine readable and executable instructions can be accessed by the one or more processors 102. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 106. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, the vehicle system 100 includes a plurality of sensors 108 for detecting objects and/or environmental conditions. The plurality of sensors 108 are coupled to the communication path 104 and communicatively coupled to the one or more processors 102. In some embodiments, the plurality of sensors 108 include a camera 108a. The camera 108a may be any device having an array of sensing devices (e.g., pixels) capable of detecting radiation in an ultraviolet wavelength band, a visible light wavelength band, or an infrared wavelength band. The camera 108a may have any resolution. The camera 108a may include an omni-directional camera, or a panoramic camera. In some embodiments, one or more optical components, such as a mirror, fish-eye lens, or any other type of lens may be optically coupled to the camera 108a. The camera 108a may be used to capture an image of objects external to the vehicle. In some embodiments, the vehicle system 100 may be able to determine the identification of an object external to the vehicle (for example, another vehicle, a pedestrian, a tree, etc.) based on the captured image from the camera 108a. The camera 108a may communicate captured information to the controller 101. Some embodiments may not include the camera 108a.

The plurality of sensors 108 may include a proximity sensor 108b. The proximity sensor 108b detects a distance between the proximity sensor 108b and an object nearby and communicates the proximity information to the controller 101 of the vehicle system 100. The proximity sensor 108b may be any device capable of outputting a proximity signal indicative of the proximity of an object to the proximity sensor 108b. In some embodiments, the proximity sensor 108b may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the proximity sensor 108b. In some embodiments, the vehicle system 100 may be configured to determine the presence of an object proximate to the vehicle based on a signal from the proximity sensor 108b.

The plurality of sensors 108 may include one or more environment sensors 108c. The one or more environment sensors 108c may include a temperature sensor for sensing a temperature outside the vehicle, a moisture sensor for sensing a humidity outside the vehicle, a fog detector sensor, etc. Some embodiments may not include the one or more environment sensors 108c.

Still referring to FIG. 1, the vehicle system 100 includes a steering adjusting unit 112. The steering adjusting unit 112 is coupled to the communication path 104. The steering adjusting unit 112 is mechanically and/or electrically coupled to a steering wheel 110 and driving wheels 114. The driving wheels 114 are configured to be steered in response to a rotation of the steering wheel 110. The steering adjusting unit 112 includes a steering sensitivity adjusting unit 112a.

In embodiments, the steering sensitivity adjusting unit 112a may be an actuator having a variable transmission ratio mechanism. The actuator is mechanically coupled between the steering wheel 110 and the driving wheels 114. The steering sensitivity adjusting unit 112a may adjust a sensitivity of the steering wheel 110 by varying a transmission ratio of the steered angle of the driving wheels 114 to the rotation angle of the steering wheel 110. The steered angle of the driving wheels 114 is an angle between a driving wheel axis before the rotation of the steering wheel 110 and a driving wheel axis after the rotation of the steering wheel 110, for example, an angle $\theta_2$ in FIG. 2A. The rotation angle of the steering wheel 110 is an angle between a steering wheel axis before the rotation of the steering wheel 110 and a steering wheel axis after the rotation of the steering wheel 110, for example, an angle $\theta_1$ in FIG. 2A. The detailed of varying transmission ratio will be described with reference to FIGS. 2A, 2B and 3 below. The variable transmission ratio mechanism may be, for example, a variable gear ratio steering (VGRS) mechanism.

In some embodiments, the steering sensitivity adjusting unit 112a may be a logic circuit that receives a signal indicating a rotation of the steering wheel 110 and outputs a signal for steering the driving wheels 114 in response to the signal from the steering wheel 110. The logic circuit varies a transmission ratio of the steered angle of the driving wheels 114 to the rotation angle of the steering wheel 110.

The steering adjusting unit 112 includes a steering resistance adjusting unit 112b configured to change a resistance or stiffness of the steering wheel 110. For example, the steering resistance adjusting unit 112b may increase a resistance of the steering wheel 110 such that a driver of the vehicle is required to apply a greater force to rotate the steering wheel 110 as compared the steering wheel 110 with no additional resistance. The resistance of the steering wheel 110 may be increased in several ways, for example, by applying a torque against a rotation torque applied by a driver to the steering wheel 110, increasing a friction that applies a force against a rotation torque applied by a driver in a similar operative manner as brake pads apply friction to driving wheels, etc. In some embodiments, the steering adjusting unit 112 may include only one of the steering sensitivity adjusting unit 112a and the steering resistance adjusting unit 112b. In some embodiments, the steering resistance adjusting unit 112b may cause the steering wheel 110 to provide haptic feedback to a driver. For example, the steering resistance adjusting unit 112b may cause the steering wheel 110 to vibrate using a vibration device integrated within the steering wheel 110 to provide vibration feedback to a driver in order to give an alert to the driver.

Still referring to FIG. 1, the vehicle system 100 includes an accelerator adjusting unit 116. The accelerator adjusting unit 116 is coupled to the communication path 104. In embodiments, the accelerator adjusting unit 116 is electrically coupled to an accelerator position sensor 118a of the accelerator pedal 118, and outputs a signal for controlling the throttle valve 123 of the engine 122 in response to a signal from the accelerator position sensor 118a. The accelerator position sensor 118a may be positioned proximate to the accelerator pedal 118. The accelerator position sensor 118a detects a displacement of the accelerator pedal 118 due to depress or release by a driver and transmits the displacement value to the accelerator adjusting unit 116.

The accelerator adjusting unit 116 includes an accelerator sensitivity adjusting unit 116a. The accelerator sensitivity adjusting unit 116a may be a logic circuit configured to change a sensitivity of the accelerator pedal 118 by changing the displacement value obtained by the accelerator position sensor 118a. For example, when the accelerator position sensor 118a detects that the accelerator pedal 118 is depressed by 10 centimeters, the accelerator sensitivity adjusting unit 116a may decrease the sensitivity of the accelerator pedal 118 by changing the displacement value from 10 centimeters to 5 centimeters. That is, the sensed value associated with 10 centimeters of displacement is converted to a value indicating 5 centimeters of displacement. In a similar manner, when the accelerator position sensor 118a detects that the accelerator pedal 118 is depressed by 10 centimeters, the accelerator sensitivity adjusting unit 116a may increase the sensitivity of the accelerator pedal 118 by changing the displacement value from 10 centimeters to 15 centimeters. The accelerator adjusting unit 116 may send an instruction for opening the throttle valve 123 based on the changed displacement value.

In some embodiments, the accelerator sensitivity adjusting unit 116a is mechanically coupled to the accelerator pedal 118 and the throttle valve 123. The throttle valve 123 is operated in response the mechanical movement of the accelerator pedal 118. For example, if the accelerator pedal 118 is depressed by one centimeter, the throttle valve is opened 10% of the maximum opening, and if depressed by two centimeters, the throttle valve is opened 20% of the maximum opening. The accelerator sensitivity adjusting unit 116a may be an actuator that includes an input linkage connected to the accelerator pedal 118 and an output linkage connected to the throttle valve 123, and adjusts the ratio of a movement (e.g., linear movement) of the input linkage to a movement of the output linkage based on an instruction from the controller 101 for adjusting a sensitivity of the accelerator pedal 118.

The accelerator adjusting unit 116 includes an accelerator resistance adjusting unit 116b. The accelerator resistance adjusting unit 116b is configured to change a resistance or stiffness of the accelerator pedal 118. For example, the accelerator resistance adjusting unit 116b increases a resistance of the accelerator pedal 118 such that a driver of the vehicle is required to apply a greater force to the accelerator pedal 118 as compared the accelerator pedal 118 with no resistance change. The resistance of the accelerator pedal 118 may be increased in several ways, for example, by increasing a friction that applies a force against a depressing force applied to the accelerator pedal 118 in a similar operative manner as brake pads apply friction to driving wheels. In some embodiments, the accelerator adjusting unit 116 may include only one of the accelerator sensitivity adjusting unit 116a and the accelerator resistance adjusting unit 116b.

The accelerator pedal 118 includes a haptic feedback device 118b. The haptic feedback device 118b may be any device capable of providing tactile feedback to a user. For example, the haptic feedback device 118b may be a vibration device (such as in embodiments in which tactile feedback is delivered through vibration). The haptic feedback device 118b provides vibration feedback to a driver when the plurality of sensors 108 detect an emergency situation (e.g., an object is quickly approaching toward the vehicle of the driver).

Still referring to FIG. 1, the engine 122 is coupled to the communication path 104. The engine 122 includes the throttle valve 123. The engine 122 may receive a dislocation value from the accelerator pedal 118 via the accelerator adjusting unit 116 and control the opening of the throttle valve 123 based on the dislocation value.

The vehicle system 100 may further comprise a speaker 124 coupled to the communication path 104 such that the communication path 104 communicatively couples the speaker 124 to other modules of the vehicle system 100. The speaker 124 transforms data signals from the vehicle system 100 into audible mechanical vibrations. The speaker 124 may alert a driver by providing an alert sound when the plurality of sensors 108 detect an emergency situation (e.g., an object is quickly approaching toward the vehicle of the driver).

Figure 2B:
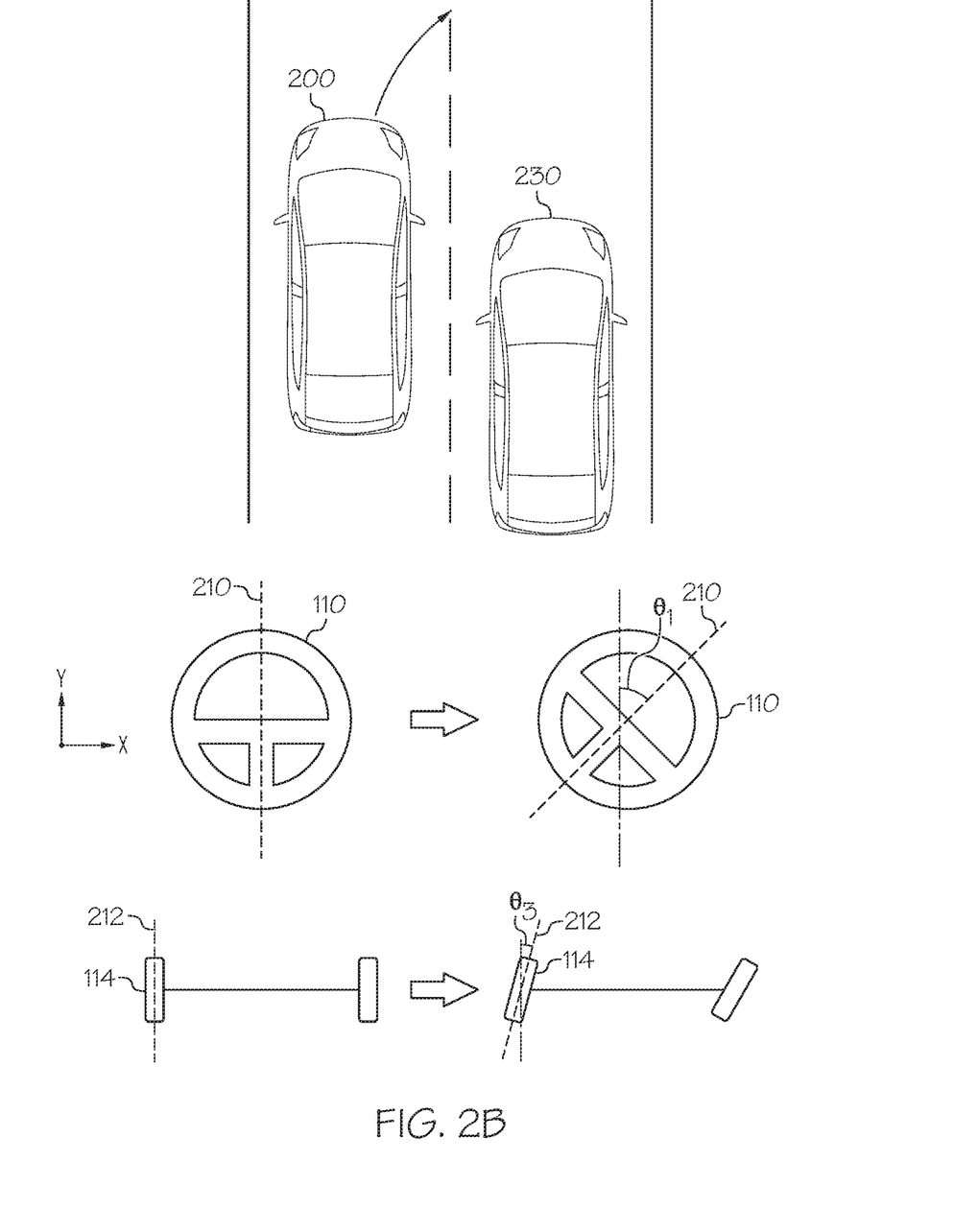

FIGS. 2A and 2B depict adjusting a sensitivity of the steering wheel 110 in accordance with one or more embodiments shown and described herein. FIG. 2A depicts a relationship between the steering wheel 110 and the driving wheels 114 when the sensitivity of the steering wheel 110 is not adjusted, i.e., during a normal operation of the steering wheel 110. In FIG. 2A, a vehicle 200 driving on a road is making a right turn (i.e., turning toward +x direction). The vehicle 200 includes the vehicle system 100 shown in FIG. 1. The plurality of sensors 108 of the vehicle 200 detect no object proximate to the vehicle 200. Before the vehicle 200 makes a turn, a steering wheel axis 210 of the steering wheel 110 is aligned with the y axis. A driving wheel axis 212 is also aligned with the y axis. Once a driver of the vehicle 200 rotates the steering wheel 110 clockwise by the amount of an angle $\theta_1$ as shown in FIG. 2A, the driving wheel axis 212 also rotates clockwise by the amount of an angle $\theta_2$ from its original position to have the vehicle 200 make a turn toward +x direction. In this example, because the plurality of sensors 108 of the vehicle 200 detect no object proximate to the vehicle 200, the steering adjusting unit 112 does not adjust a sensitivity of the steering wheel 110.

FIG. 2B depicts a relationship between the steering wheel 110 and the driving wheels 114 when the sensitivity of the steering wheel 110 is adjusted. In FIG. 2B, a vehicle 200 driving on a road is making a right turn (i.e., turning toward +x direction). The vehicle 200 includes the vehicle system 100 shown in FIG. 1. The plurality of sensors 108 of the vehicle 200 detect a vehicle 230 proximate to the vehicle 200. For example, the camera 108a senses the vehicle 230 and captures the image of the vehicle 230, and sends the captured image to the controller 101. Then, the controller 101 instructs the steering adjusting unit 112 to reduce the sensitivity of the steering wheel 110. In another example, the proximity sensor 108b of the vehicle 200 detects the vehicle 230 and determines that the vehicle 200 is approaching toward the vehicle 230 when the vehicle 200 makes a right turn. The proximity sensor 108b transmits this information to the controller 101, and the controller 101 instructs the steering adjusting unit 112 to reduce the sensitivity of the steering wheel 110. The steering adjusting unit 112 reduces a sensitivity of the steering wheel 110, for example, by reducing a transmission ratio of the steered angle of the driving wheels 114 to the rotation angle of the steering wheel 110 in response to the instruction from the controller 101.

Before the vehicle 200 makes a right turn, a steering wheel axis 210 of the steering wheel 110 is aligned with the y axis as shown in FIG. 2B. A driving wheel axis 212 is also aligned with the y axis as shown in FIG. 2B. Once a driver of the vehicle 200 rotates the steering wheel 110 clockwise by the amount of an angle $\theta_1$ as shown in FIG. 2B, the driving wheel axis 212 rotates clockwise by the amount of an angle $\theta_3$ from its original position to have the vehicle 200 make a turn toward +x direction. The angle $\theta_3$ is smaller than the angle $\theta_2$ in FIG. 2A because of the reduced sensitivity of the steering wheel 110. For example, if the angle $\theta_2$ is 20 degrees, the angle $\theta_3$ can be about 10 degrees. The reduced sensitivity of the steering wheel 110 may prevent a potential accident because it may prevent the vehicle 200 from making a sudden right turn toward the vehicle 230.

In some embodiment, the one or more environment sensors 108c detect environment conditions, and send the environment condition to the controller 101. The controller 101 instructs the steering adjusting unit 112 to reduce the sensitivity of the steering wheel 110 based on the environment conditions. For example, the one or more environment sensors 108c detect that the temperature is less than 32 degrees Fahrenheit and it is snowing, and send this information to the controller 101. The controller 101 instructs the steering adjusting unit 112 to reduce the sensitivity of the steering wheel 110 based on the freezing and snowing condition because making a sudden turn may cause the vehicle 200 to slip.

In some embodiments, the controller 101 instructs the steering adjusting unit 112 to increase the sensitivity of the steering wheel 110 based on signals from the plurality of sensors 108. For example, the controller 101 instructs the steering adjusting unit 112 to increase the sensitivity of the steering wheel 110 if the camera 108a does not detect any object proximate to the vehicle 200. In some embodiments, the controller 101 instructs the steering adjusting unit 112 to increase the sensitivity of the steering wheel 110 to a default sensitivity from the reduced sensitivity once abnormal conditions no longer exists. For example, the controller 101 instructs the steering adjusting unit 112 to increase the sensitivity of the steering wheel 110 to a default sensitivity if the temperature detected by the one or more environment sensors 108c is over 32 degrees Fahrenheit.

In some embodiments, if an object detected by the plurality of sensors 108 is a human (e.g., a pedestrian), the steering adjusting unit 112 may significantly reduce the sensitivity of the steering wheel 110 when the vehicle 200 is turning toward the human. By significantly reducing the sensitivity of the steering wheel 110, the vehicle system 100 may prevent a potential accident with a pedestrian.

Figure 3:
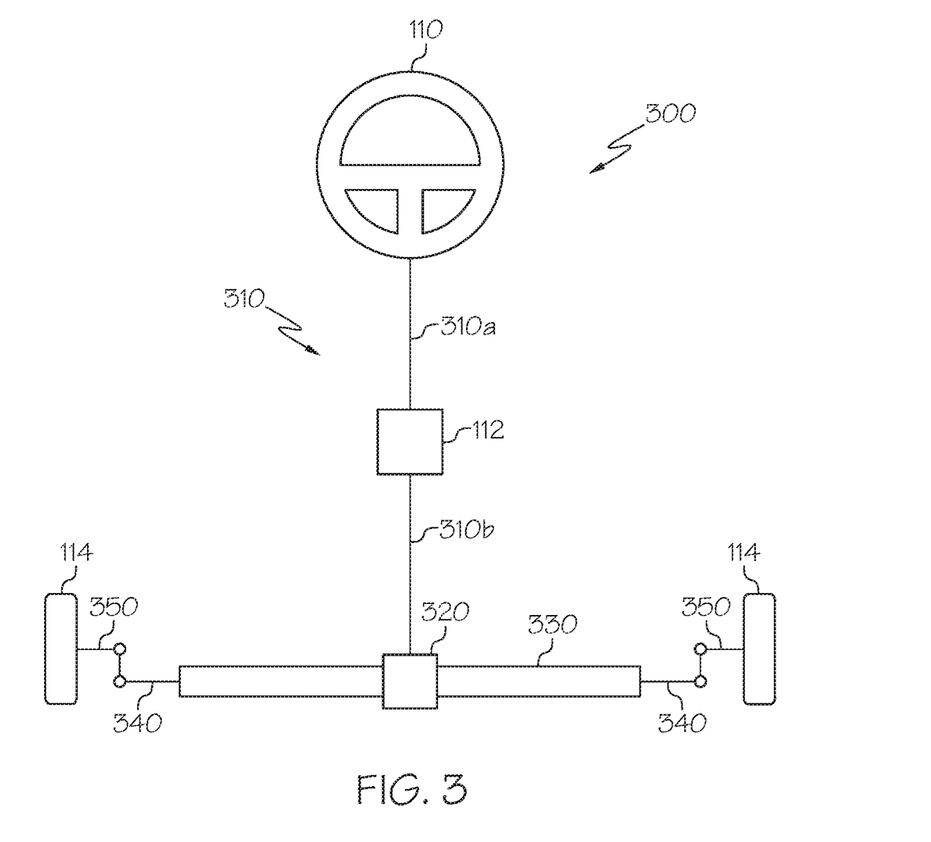
FIG. 3 schematically depicts a steering control system where the sensitivity of a steering wheel is adjusted by an actuator in accordance with one or more embodiments shown and described herein.

FIG. 3 schematically depicts a steering control system 300 where the sensitivity of the steering wheel 110 is adjusted by a mechanical actuator in accordance with one or more embodiments shown and described herein. The steering control system 300 includes the steering wheel 110, the steering adjusting unit 112, a steering shaft 310, a pinion 320, a steering rack 330, tie rods 340, knuckle arms 350, and the driving wheels 114.

The steering control system 300 is a system that is equipped for a vehicle and that carries out control for steering the driving wheels 114 in response to operation of the steering wheel 110, or the like. The steering wheel 110 is operated by a driver in order to, for example, steer the vehicle. The steering wheel 110 is connected to the pinion 320 via the steering shaft 310.

The pinion 320 is configured to be rotatable with the rotation of the steering shaft 310. The steering rack 330 is configured to be movable with the rotation of the pinion 320. The knuckle arms 350 are coupled to the steering rack 330 via the respective tie rods 340, and the driving wheels 114 are respectively coupled to the knuckle arms 350. In this case, the tie rods 340 and the knuckle arms 350 are operated by the steering rack 330 to thereby steer the driving wheels 114 coupled to the knuckle arms 350.

In embodiments, the steering adjusting unit 112 is configured to decrease or increase the speed of rotation of the steering shaft 310, input to the pinion 320. The steering adjusting unit 112 varies the transmission ratio between the rotation angle of the steering wheel 110 and the steered angle of the driving wheels 114. The steering adjusting unit 112 may include, for example, a variable gear ratio steering mechanism. Specifically, the steering adjusting unit 112 may include a motor, and the like, and couples an input shaft 310a of the steering shaft 310 to an output shaft 310b of the steering shaft 310 at a variable gear portion. The transmission ratio may be a ratio of the rotation of the output shaft 310b to the rotation of the input shaft 310a. As discussed in FIG. 2B, when the plurality of sensors 108 of the vehicle 200 detect an object proximate to the vehicle 200 or a certain environmental condition, the controller 101 instructs the steering adjusting unit 112 to reduce the transmission ratio, and thus the sensitivity of the steering wheel 110 is reduced.

Figure 4A:
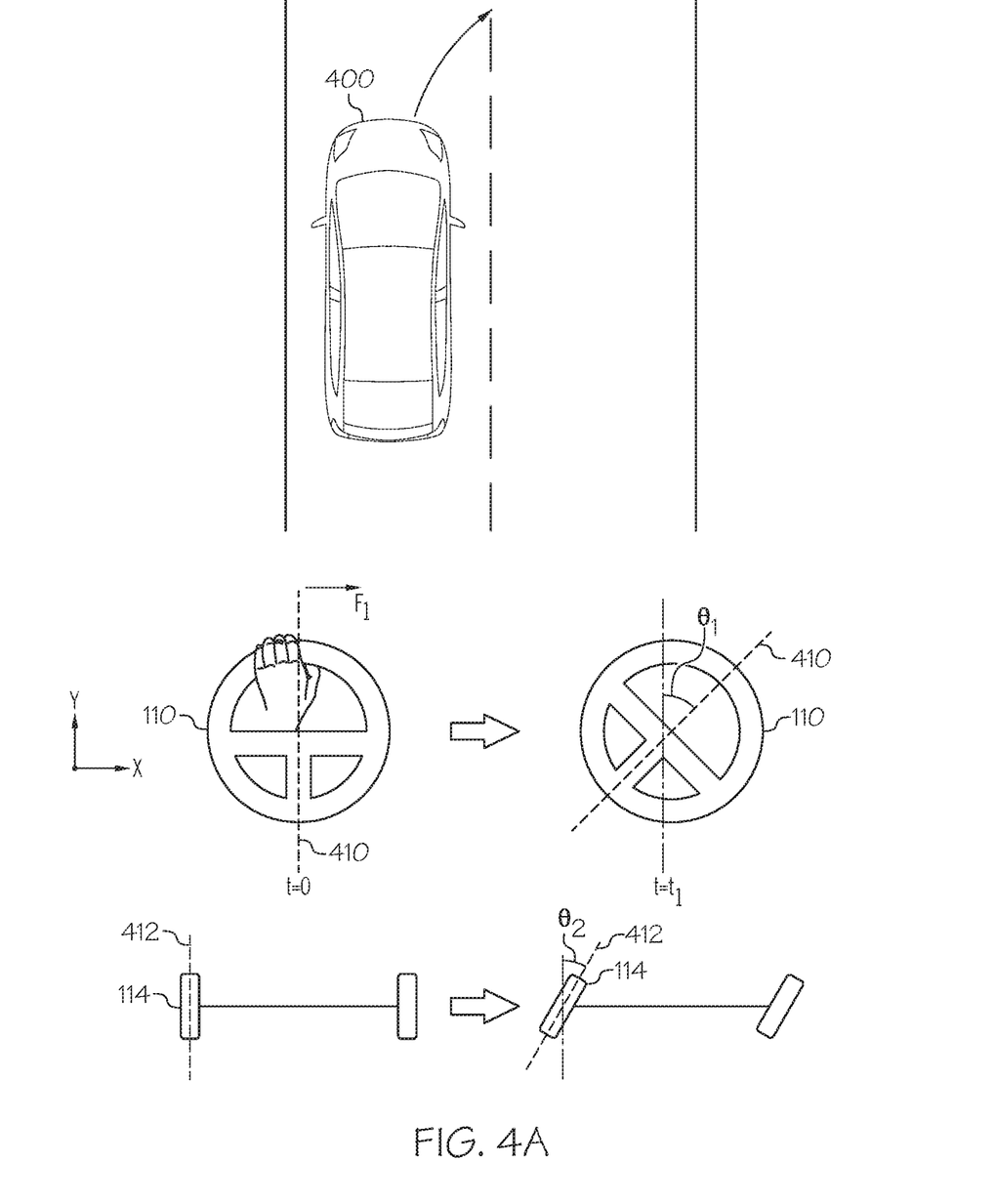
FIGS. 4A and 4B depict adjusting a resistance of a steering wheel in accordance with one or more embodiments shown and described herein.
Figure 4B:
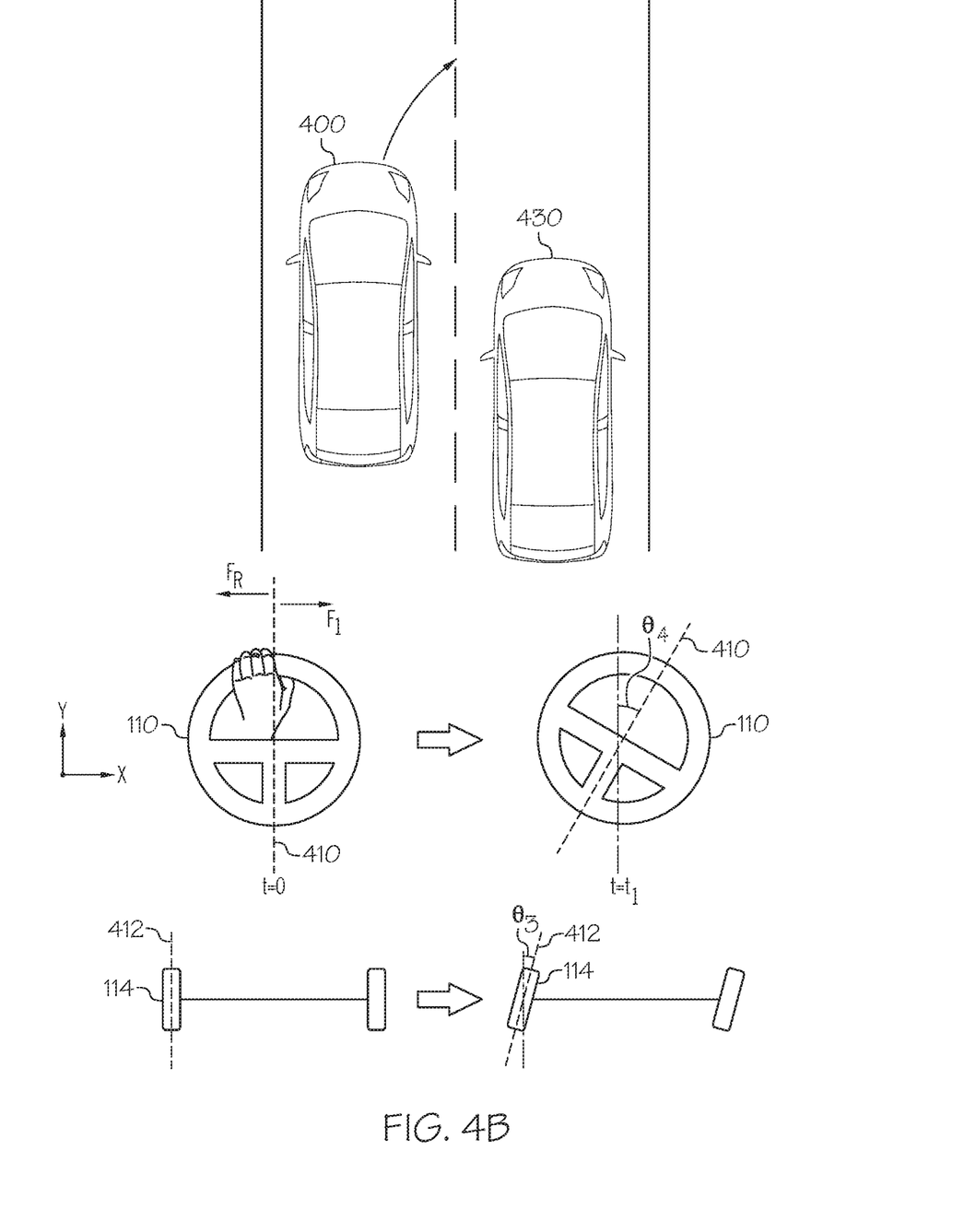

FIGS. 4A and 4B depict adjusting a resistance of the steering wheel 110 in accordance with one or more embodiments shown and described herein. FIG. 4A depicts a relationship between the steering wheel 110 and the driving wheels 114 when the resistance of the steering wheel 110 is not adjusted, i.e., during a normal operation of the steering wheel 110. In FIG. 4A, a vehicle 400 driving on a road is making a right turn (i.e., turning toward +x direction). The vehicle 400 includes the vehicle system 100 shown in FIG. 1. The plurality of sensors 108 of the vehicle 400 detect no object proximate to the vehicle 400. Before the vehicle 400 makes a turn, a steering wheel axis 410 of the steering wheel 110 is aligned with the y axis. A driving wheel axis 412 is also aligned with the y axis. Once a driver of the vehicle 400 rotates the steering wheel 110 clockwise by applying a force $F_1$ at time $t_0$, the steering wheel 110 is rotated by the amount of an angle $\theta_1$ at time $t_1$ as shown in FIG. 4A. In response, the driving wheel axis 412 also rotates clockwise by the amount of an angle $\theta_2$ from its original position at time $t_1$. In this example, because the plurality of sensors 108 of the vehicle 400 detect no object proximate to the vehicle 400, the steering adjusting unit 112 does not adjust a resistance of the steering wheel 110.

FIG. 4B depicts a relationship between the steering wheel 110 and the driving wheels 114 when the resistance of the steering wheel 110 is adjusted. In FIG. 4B, a vehicle 400 driving on a road is making a right turn (i.e., turning toward +x direction). The vehicle 400 includes the vehicle system 100 shown in FIG. 1. The plurality of sensors 108 of the vehicle 400 detect a vehicle 430 proximate to the vehicle 400. For example, the camera 108a senses the vehicle 430 and captures the image of the vehicle 430, and sends the captured image to the controller 101. Then, the controller 101 instructs the steering adjusting unit 112 to increase the resistance of the steering wheel 110. In another example, the proximity sensor 108b of the vehicle 400 detects the vehicle 430 and determines that the vehicle 400 is approaching toward the vehicle 430 when the vehicle 400 makes a right turn. The proximity sensor 108b transmits this information to the controller 101, and the controller 101 instructs the steering adjusting unit 112 to increase the resistance of the steering wheel 110. The steering adjusting unit 112 increases the resistance of the steering wheel 110 in response to the instruction from the controller 101. For example, an increased resistance force $F_R$ is applied when a driver rotates the steering wheel 110 by applying the force $F_1$.

In some embodiments, the steering resistance adjusting unit 112b may cause the steering wheel 110 to provide haptic feedback to a driver when the plurality of sensors 108 of the vehicle 400 detect an object, such as a vehicle 430, proximate to the vehicle 400. For example, the steering resistance adjusting unit 112b may cause the steering wheel 110 to vibrate using a vibration device integrated in the steering wheel 110 to provide vibration feedback to a driver in order to give an alert to the driver.

In embodiments, before the vehicle 400 makes a right turn, a steering wheel axis 410 of the steering wheel 110 is aligned with the y axis as shown in FIG. 4B. A driving wheel axis 412 is also aligned with the y axis as shown in FIG. 4B. The driver of the vehicle 400 starts rotating the steering wheel 110 clockwise at time $t_0$ by applying the force $F_1$ and at time $t_1$, the steering wheel 110 is rotated by the amount of an angle $\theta_4$ as shown in FIG. 4B. The angle $\theta_4$ in FIG. 4B is smaller than the angle $\theta_1$ in FIG. 4A when the same rotating force $F_1$ is applied because of the additional resistance force $F_R$. Because the steering wheel 110 is rotated by a reduced amount as opposed to the steering wheel in FIG. 4A, the driving wheels 114 are rotated clockwise by a reduced amount of $\theta_3$. For example, if the angle $\theta_2$ in FIG. 4A is 20 degrees, the angle $\theta_3$ in FIG. 4B can be about 10 degrees. The increased resistance of the steering wheel 110 may prevent a potential accident because it prevents the vehicle 400 from making a sudden right turn toward the vehicle 430.

In some embodiment, the one or more environment sensors 108c detect environment conditions, and send the environment condition to the controller 101. The controller 101 instructs the steering adjusting unit 112 to increase the resistance of the steering wheel 110 based on the environment conditions. For example, the one or more environment sensors 108c detect that the temperature is less than 32 degrees Fahrenheit and it is snowing, and send this information to the controller 101. The controller 101 instructs the steering adjusting unit 112 to increase the resistance of the steering wheel 110 based on the freezing and snowing condition because making a sudden turn may cause the vehicle 400 to slip.

In some embodiments, the controller 101 instructs the steering adjusting unit 112 to reduce the resistance of the steering wheel 110 based on signals from the plurality of sensors 108. For example, the controller 101 instructs the steering adjusting unit 112 to reduce the resistance of the steering wheel 110 if the camera 108a does not detect any object proximate to the vehicle 400. In some embodiments, the controller 101 instructs the steering adjusting unit 112 to reduce the resistance of the steering wheel 110 to a default resistance from the increased resistance once abnormal conditions no longer exists. For example, the controller 101 instructs the steering adjusting unit 112 to reduce the resistance of the steering wheel 110 to a default resistance if the temperature detected by the one or more environment sensors 108c is over 32 degrees Fahrenheit or no snowing condition is detected by the one or more environment sensors 108c.

Figure 5A:
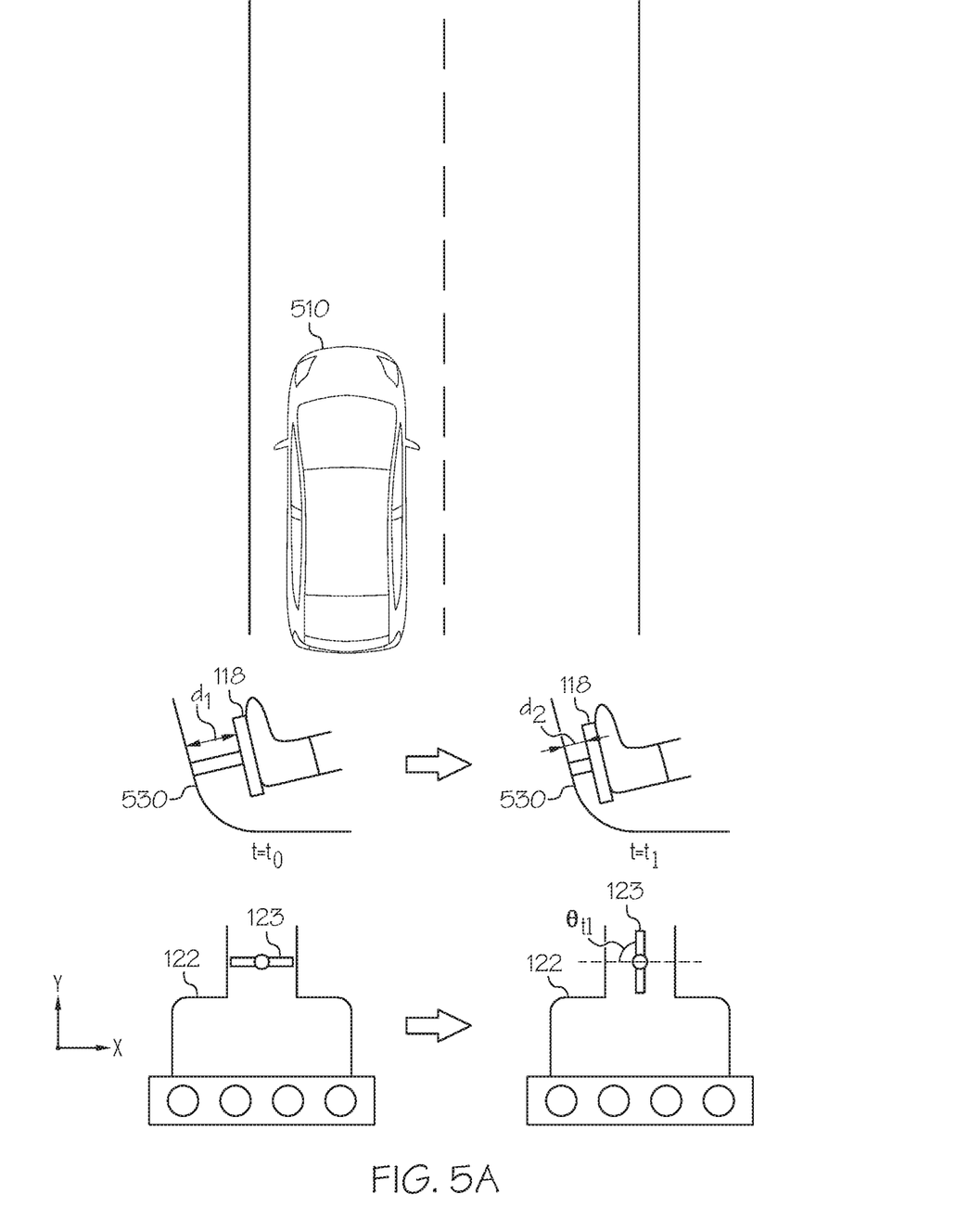
FIGS. 5A and 5B depict adjusting a sensitivity of an accelerator pedal in accordance with one or more embodiments shown and described herein.
Figure 5B:
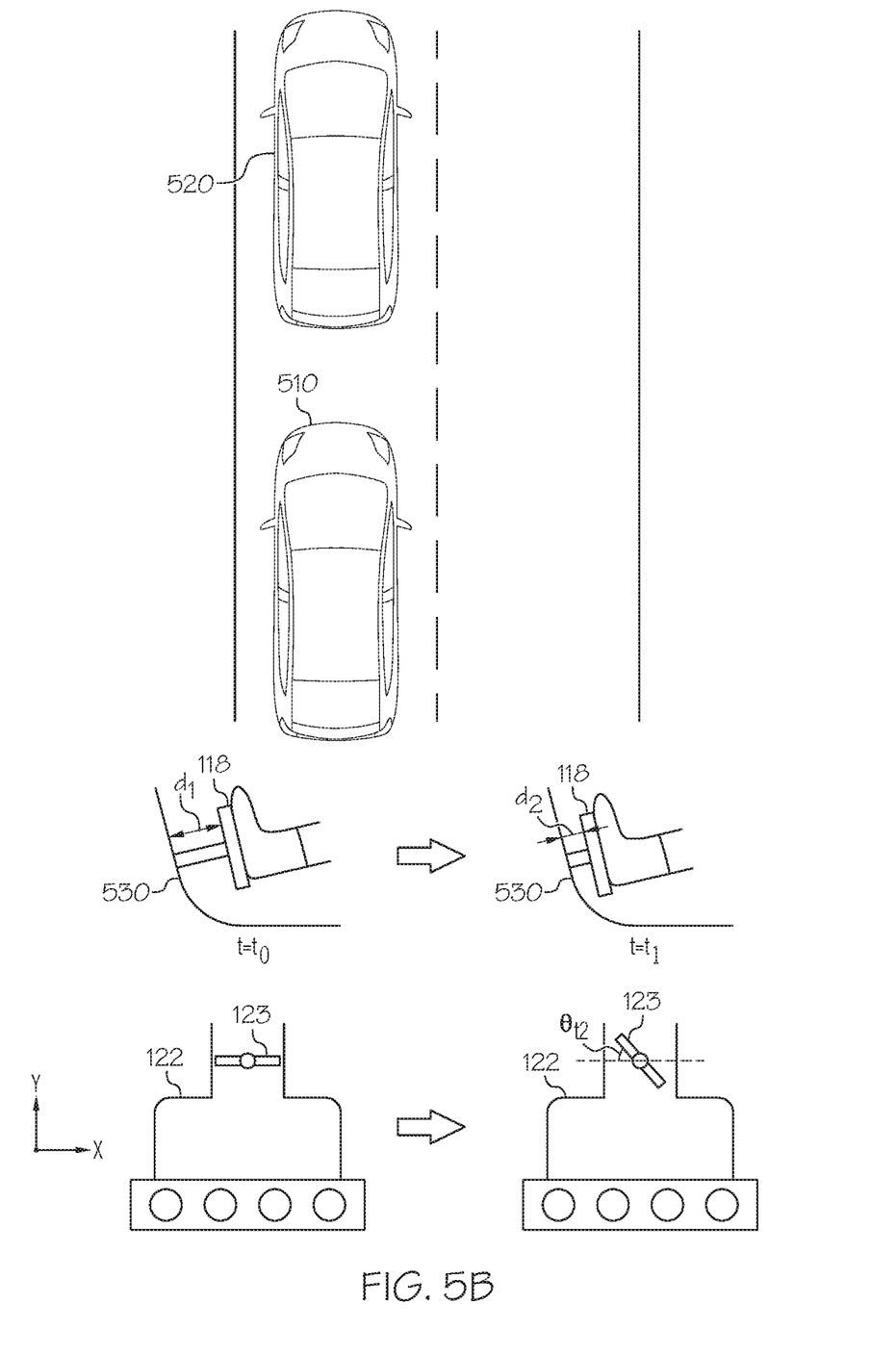

FIGS. 5A and 5B depict adjusting a sensitivity of the accelerator pedal 118 in accordance with one or more embodiments shown and described herein. FIG. 5A depicts a relationship between the accelerator pedal 118 and the throttle valve 123 of the engine 122 when the sensitivity of the accelerator pedal 180 is not adjusted, i.e., during a normal operation of the accelerator pedal 180. In FIG. 5A, a vehicle 510 driving on a road starts acceleration (i.e., acceleration toward +y direction). The vehicle 510 includes the vehicle system 100 shown in FIG. 1. The plurality of sensors 108 of the vehicle 510 detect no object proximate to the vehicle 510. In embodiments, before the vehicle 510 starts accelerating, a distance between the accelerator pedal 118 and a base 530 is $d_1$, and the throttle valve 123 is in parallel with the x axis (i.e., the throttle valve is not opened) as shown in FIG. 5A.

The driver of the vehicle 510 starts depressing the accelerator pedal 118 at time $t_0$. At time $t_1$, the distance between the accelerator pedal 118 and the base 530 becomes $d_2$ as shown in FIG. 5A. That is, the accelerator pedal 118 is dislocated by the amount of $(d_1-d_2)$. In response to the dislocation of the accelerator pedal 118, the throttle valve 123 may be rotated. The rotation amount of the throttle valve 123 (i.e., an opening degree of the throttle valve 123) may be proportional to the dislocation of the accelerator pedal 118. In this example, the throttle valve 123 is rotated by the amount of an angle $\theta_{t1}$ from its position at $t_0$. Because the plurality of sensors 108 of the vehicle 510 detect no object proximate to the vehicle 510, the accelerator adjusting unit 116 does not adjust the sensitivity of the accelerator pedal 180.

FIG. 5B depicts a relationship between the accelerator pedal 180 and the throttle valve 123 when the sensitivity of the throttle valve 123 is adjusted. In FIG. 5B, a vehicle 510 driving on a road starts acceleration (i.e., acceleration toward +y direction). The vehicle 510 includes the vehicle system 100 shown in FIG. 1. The plurality of sensors 108 of the vehicle 510 detect a vehicle 520 in front of the vehicle 510. For example, the camera 108*a* senses the vehicle 520 and captures the image of the vehicle 520, and sends the captured image to the controller 101. Then, the controller 101 instructs the accelerator adjusting unit 116 to reduce the sensitivity of the accelerator pedal 118. In another example, the proximity sensor 108*b* of the vehicle 510 detects the vehicle 520 and determines that the vehicle 510 is approaching toward the vehicle 520 when the vehicle 510 starts acceleration. The proximity sensor 108*b* transmits this information to the controller 101, and the controller 101 instructs the accelerator adjusting unit 116 to reduce the sensitivity of the accelerator pedal 118.

Before the vehicle 510 starts acceleration, a distance between the accelerator pedal 118 and a base 530 is $d_1$ at time $t_0$, and the throttle valve 123 is aligned with the x axis (i.e., the throttle valve is not opened) as shown in FIG. 5B. A driver of the vehicle 510 starts depressing the accelerator pedal 118 at time $t_0$, and the distance between the accelerator pedal 118 and the base 530 becomes $d_2$ at $t=t_1$, the throttle valve 123 rotates by the amount of an angle $\theta_{r2}$, which allows fuel to be injected in the engine 122. In embodiments, the throttle valve 123 in FIG. 5B rotates by a smaller amount compared to the throttle valve 123 in FIG. 5A due to the reduced sensitivity of the accelerator pedal 118. For example, if the angle $\theta_{r1}$ in FIG. 5A is 90 degrees, the angle $\theta_{r2}$ in FIG. 5B can be about 45 degrees. The reduced sensitivity of the accelerator pedal 118 may prevent a potential accident because it prevents the vehicle 510 from making a sudden acceleration toward the vehicle 520.

In some embodiments, the one or more environment sensors 108*c* detect environment conditions, and send the environment condition to the controller 101. The controller 101 instructs the accelerator adjusting unit 116 to reduce the sensitivity of the accelerator pedal 118 based on the environment conditions. For example, the one or more environment sensors 108*c* detect that the temperature is less than 32 degrees Fahrenheit and it is snowing, and send this information to the controller 101. The controller 101 instructs the accelerator adjusting unit 116 to reduce the sensitivity of the accelerator pedal 118 based on the freezing and snowing conditions because making a sudden acceleration under those conditions may cause the vehicle 510 to slip.

In some embodiments, if an object detected by the plurality of sensors 108 is a human (e.g., a pedestrian), the accelerator adjusting unit 116 may significantly reduce the sensitivity of the accelerator pedal 118 when the vehicle 510 is approaching toward the human. That is, the vehicle 510 rarely accelerates even when a driver depresses the accelerator pedal 118. By significantly reducing the sensitivity of the accelerator pedal 118, the vehicle system 100 may prevent a potential accident with a pedestrian.

In some embodiments, the controller 101 instructs the accelerator adjusting unit 116 to increase the sensitivity of the accelerator pedal 118 based on signals from the plurality of sensors 108. For example, the controller 101 instructs the accelerator adjusting unit 116 to increase the sensitivity of the accelerator pedal 118 if the camera 108*a* does not detect any object proximate to the vehicle 510. In some embodiments, the controller 101 instructs the accelerator adjusting unit 116 to increase the sensitivity of the accelerator pedal 118 to a default sensitivity from the reduced sensitivity once abnormal conditions no longer exists. For example, the controller 101 instructs the accelerator adjusting unit 116 to increase the sensitivity of the accelerator pedal 118 to a default sensitivity if the temperature detected by the one or more environment sensors 108*c* is over 32 degrees Fahrenheit.

Figure 6A:
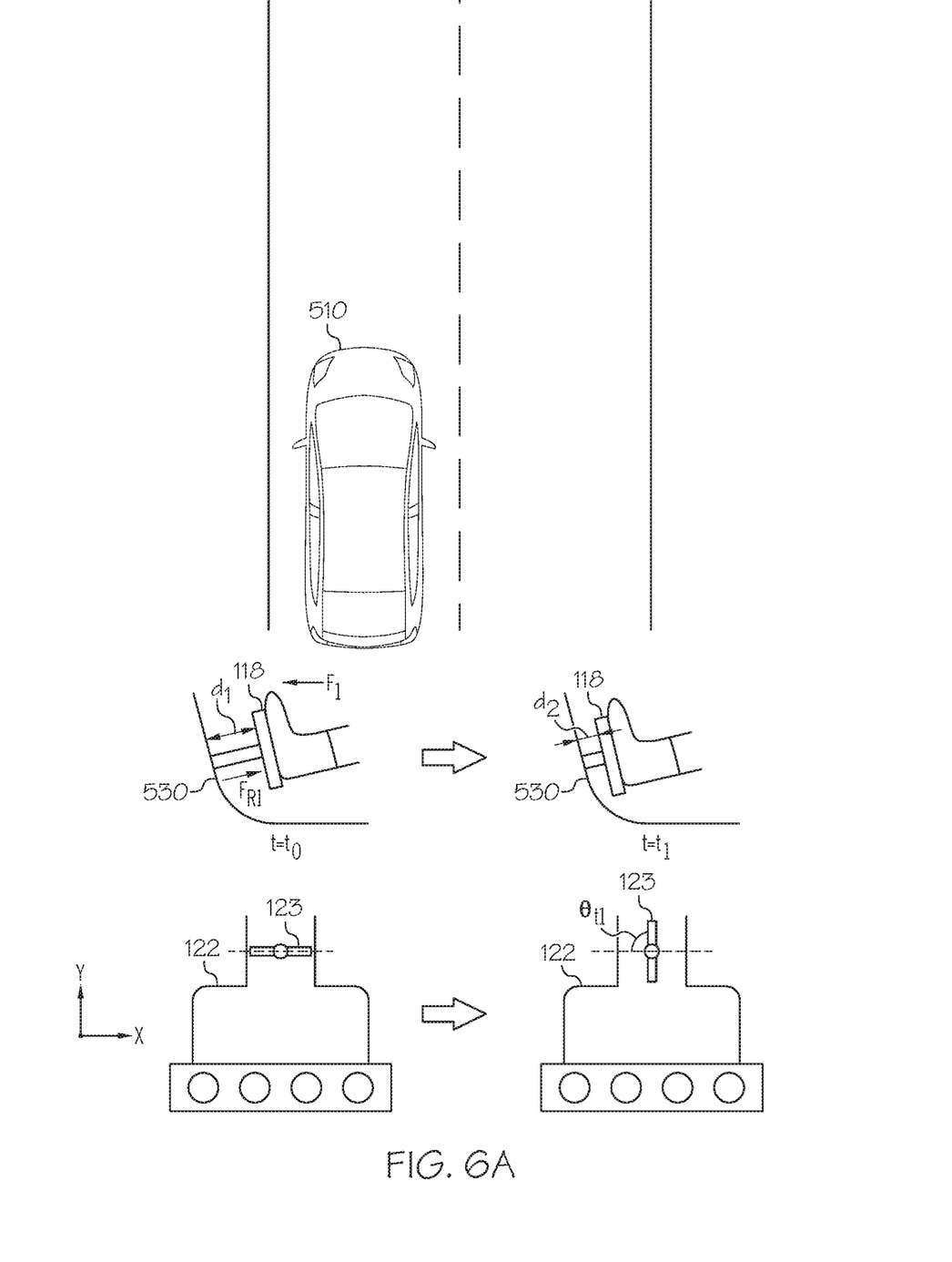
FIGS. 6A and 6B depict adjusting a resistance of an accelerator pedal in accordance with one or more embodiments shown and described herein.
Figure 6B:
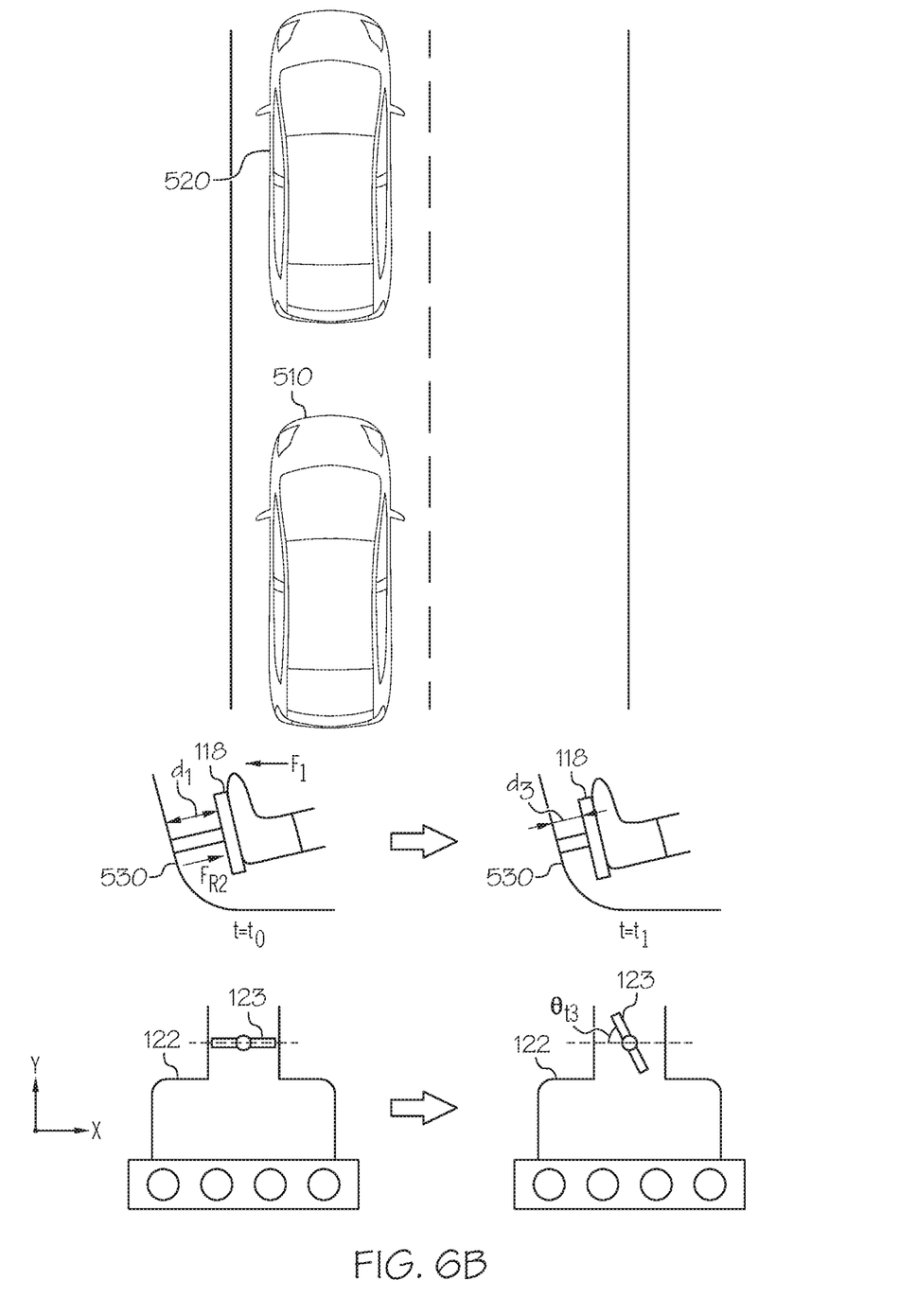

FIGS. 6A and 6B depict adjusting a resistance of the accelerator pedal 118 in accordance with one or more embodiments shown and described herein. FIG. 6A depicts a relationship between the accelerator pedal 118 and the throttle valve 123 of the engine 122 when the resistance of the accelerator pedal 180 is not adjusted, i.e., during a normal operation of the accelerator pedal 180. In FIG. 6A, a vehicle 510 driving on a road starts acceleration (i.e., acceleration toward +y direction) at time $t_0$. The vehicle 510 includes the vehicle system 100 shown in FIG. 1. The plurality of sensors 108 of the vehicle 510 detect no object proximate to the vehicle 510. In some embodiments, before the vehicle 510 starts acceleration, a distance between the accelerator pedal 118 and a base 530 is $d_1$, and the throttle valve 123 is in parallel with the x axis (i.e., the throttle valve is not opened) as shown in FIG. 6A.

The driver of the vehicle 510 starts depressing the accelerator pedal 118 at time $t_0$ with force $F_1$. A resistance force $F_{R1}$ may be applied against the force $F_1$. At time $t_1$, the distance between the accelerator pedal 118 and the base 530 becomes $d_2$, as shown in FIG. 6A. That is, the accelerator pedal 118 is dislocated by the amount of $(d_1-d_2)$. The rotation amount of the throttle valve 123 (i.e., an opening degree of the throttle valve 123) may be proportional to the dislocation of the accelerator pedal 118. In this example, the throttle valve 123 is rotated by the amount of an angle $\theta_{r1}$ from its position at time $t_0$. Because the plurality of sensors 108 of the vehicle 510 detect no object proximate to the vehicle 510, the accelerator adjusting unit 116 does not adjust the resistance of the accelerator pedal 180.

FIG. 6B depicts a relationship between the accelerator pedal 180 and the throttle valve 123 when the sensitivity of the throttle valve 123 is adjusted. In FIG. 6B, a vehicle 510 driving on a road starts acceleration (i.e., acceleration toward +y direction) at $t=t_0$. The vehicle 510 includes the vehicle system 100 shown in FIG. 1. The plurality of sensors 108 of the vehicle 510 detect a vehicle 520 in front of the vehicle 510. For example, the camera 108*a* senses the vehicle 520 and captures the image of the vehicle 520, and sends the captured image to the controller 101. Then, the controller 101 instructs the accelerator adjusting unit 116 to reduce the resistance of the accelerator pedal 118. In another example, the proximity sensor 108*b* of the vehicle 510 detects the vehicle 520 and determines that the vehicle 510 is approaching toward the vehicle 520 when the vehicle 510 starts acceleration. The proximity sensor 108*b* transmits this information to the controller 101, and the controller 101 instructs the accelerator adjusting unit 116 to reduce the resistance of the accelerator pedal 118. For example, an increased resistance force $F_{R2}$ is applied against a depressing force $F_1$ by the driver when the driver depresses the accelerator pedal 180 with the depressing force $F_1$.

In some embodiments, the accelerator adjusting unit 116 may cause the haptic feedback device 118*b* to provide haptic feedback to a driver. For example, the accelerator adjusting unit 116 may cause the haptic feedback device 118*b* to vibrate to provide vibration feedback to a driver in order to give an alert to the driver.

Before the vehicle 510 starts acceleration, a distance between the accelerator pedal 118 and a base 530 is $d_1$ at time $t_0$, and the throttle valve 123 is in parallel with the x axis (i.e., the throttle valve is not opened) as shown in FIG. 6B. The driver of the vehicle 510 starts depressing the accelerator pedal 118 at time $t_0$. At time $t_1$, the distance between the accelerator pedal 118 and the base 530 becomes $d_3$ as shown in FIG. 6B. That is, the accelerator pedal 118 is dislocated by the amount of $(d_1-d_3)$. The dislocation amount $(d_1-d_3)$ is smaller than the dislocation amount $(d_1-d_2)$ in FIG. 6A because the depressing force $F_1$ is reduced by the increased resistance force $F_{R2}$. Because the accelerator pedal 118 is depressed by a reduced amount as opposed to the accelerator pedal 118 in FIG. 6A, the throttle valve 123 is rotated by the amount of $\theta_{t3}$ which is less than the angle $\theta_{t1}$ in FIG. 6A. For example, if the angle $\theta_{t1}$ is 90 degrees, the angle $\theta_{t3}$ can be about 45 degrees. The increased resistance of the accelerator pedal 118 may prevent a potential accident because it prevents the vehicle 510 from making a sudden acceleration toward the vehicle 520.

In some embodiments, the controller 101 instructs the accelerator adjusting unit 116 to reduce the resistance of the accelerator pedal 118 based on signals from the plurality of sensors 108. For example, the controller 101 instructs the accelerator adjusting unit 116 to reduce the resistance of the accelerator pedal 118 if the camera 108a does not detect any object proximate to the vehicle 510. In some embodiments, the controller 101 instructs the accelerator adjusting unit 116 to reduce the resistance of the accelerator pedal 118 to a default resistance from the increased resistance once abnormal conditions no longer exists. For example, the controller 101 instructs the accelerator adjusting unit 116 to reduce the resistance of the accelerator pedal 118 to a default resistance if the temperature detected by the one or more environment sensors 108c is over 32 degrees Fahrenheit or no snowing condition is detected by the one or more environment sensors 108c.

It should be understood that embodiments described herein are directed to vehicle systems including one or more sensors, a steering wheel, an accelerator pedal, a steering wheel actuator, an accelerator pedal actuator, and a controller. The controller configured to detect an object based on output from the one or more sensors, adjust a sensitivity of the steering wheel with the steering wheel actuator in response to detecting the object, and adjust a sensitivity of the accelerator pedal with the accelerator actuator in response to detecting the object. By adjusting the sensitivity of the steering wheel and/or the accelerator pedal, the vehicle systems described herein may prevent potential vehicle accidents even when a driver manipulates the steering wheel and/or the accelerator inappropriately in an emergency situation.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is, therefore, intended that the appended claims cover all such changes and modifications that are within the scope of the claimed subject matter.

What is claimed is:

1. A vehicle system comprising: one or more sensors;
a steering wheel;
a steering sensitivity adjusting unit; and
a controller communicatively coupled to the one or more sensors and the steering sensitivity adjusting unit, the controller comprising at least one processor and at least one memory module storing computer readable and executable instructions that, when executed by the at least one processor, cause the controller to:
detect an object based on output from the one or more sensors; and
send to the steering sensitivity adjusting unit an instruction for adjusting a sensitivity of the steering wheel in response to detecting the object,
wherein the steering sensitivity adjusting unit includes a logic circuit configured to:
receive an electronic signal associated with a rotation angle of the steering wheel;
output an electronic signal for steering driving wheels of the vehicle system in response to the electronic signal associated with the rotation angle of the steering wheel; and
reduce a ratio of a steered angle of the driving wheels to the rotation angle of the steering wheel in response to the instruction from the controller.

2. The vehicle system of claim 1, wherein the computer readable and executable instructions, when executed by the at least one processor, further cause the controller to:
determine whether a vehicle including the vehicle system is turning toward the object; and
send to the steering sensitivity adjusting unit an instruction for reducing the sensitivity of the steering wheel in response to determination that the vehicle is turning toward the object.

3. The vehicle system of claim 2, wherein the steering sensitivity adjusting unit includes an actuator mechanically coupled to the steering wheel.

4. The vehicle system of claim 3, further comprising:
an input shaft mechanically coupled between the steering wheel and the actuator; and
an output shaft mechanically coupled to the actuator and configured to rotate in response to a rotation of the input shaft,
wherein the actuator is configured to adjust a ratio of the rotation of the input shaft to a rotation of the output shaft in response to the instruction from the controller.

5. The vehicle system of claim 3, wherein the actuator includes a variable gear ratio steering mechanism.

6. The vehicle system of claim 2, wherein the computer readable and executable instructions, when executed by the at least one processor, further cause the controller to:
determine environmental conditions based on output from the one or more sensors; and
send to the steering sensitivity adjusting unit an instruction for adjusting the sensitivity of the steering wheel further based on the environmental conditions.

7. The vehicle system of claim 6, wherein the environmental conditions includes at least one of a raining condition, a snowing condition, and a freezing condition.

8. The vehicle system of claim 2, wherein the computer readable and executable instructions, when executed by the at least one processor, further cause the controller to:
determine a type of the object; and
send to the steering sensitivity adjusting unit an instruction for adjusting the sensitivity of the steering wheel further based on the type of the object.

9. A vehicle system comprising:
an engine including a throttle valve;
one or more sensors;
an accelerator pedal;
an acceleration sensitivity adjusting unit; and
a controller communicatively coupled to the one or more sensors and the acceleration sensitivity adjusting unit, the controller comprising at least one processor and at least one memory module storing computer readable and executable instructions that, when executed by the at least one processor, cause the controller to:

detect an object based on output from the one or more sensors; and send to the acceleration sensitivity adjusting unit an instruction for adjusting a sensitivity of the accelerator pedal in response to detecting the object, wherein an opening amount of the throttle valve is determined based on a dislocation amount of the accelerator pedal, and the acceleration sensitivity adjusting unit adjusts the sensitivity of the accelerator pedal by adjusting a ratio of the opening amount of the throttle valve to the dislocation amount of the accelerator pedal in response to the instruction from the controller.

10. The vehicle system of claim 9, wherein the acceleration sensitivity adjusting unit includes a logic circuit configured to:

receive an electronic signal associated with a dislocation amount of the accelerator pedal;

output an electronic signal for opening the throttle valve in response to the electronic signal; and adjust a ratio of an opening amount of the throttle valve to the dislocation amount of the accelerator pedal in response to the instruction from the controller.

11. The vehicle system of claim 9, wherein the acceleration sensitivity adjusting unit includes an actuator mechanically coupled to the accelerator pedal.

12. The vehicle system of claim 11, further comprising:

an input linkage mechanically coupled between the accelerator pedal and the actuator; and an output linkage mechanically coupled between the actuator and the throttle valve and configured to move to open the throttle valve in response to a movement of the input linkage, wherein the actuator is configured to adjust a ratio of the movement of the input linkage to a movement of the output linkage in response to the instruction from the controller.

13. The vehicle system of claim 9, wherein the computer readable and executable instructions, when executed by the at least one processor, further cause the controller to:

determine environmental conditions based on output from the one or more sensors; and send to the acceleration sensitivity adjusting unit an instruction for adjusting the sensitivity of the accelerator pedal further based on the environmental conditions.

14. The vehicle system of claim 9, wherein the computer readable and executable instructions, when executed by the at least one processor, further cause the controller to:

determine a type of the object; and send to the acceleration sensitivity adjusting unit an instruction for adjusting the sensitivity of the accelerator pedal further based on the type of the object.

15. The vehicle system of claim 9, wherein the computer readable and executable instructions, when executed by the at least one processor, further cause the controller to:

determine whether a vehicle including the vehicle system is approaching the object; and send to the acceleration sensitivity adjusting unit an instruction for reducing the sensitivity of the accelerator pedal in response to determination that the vehicle is approaching toward the object.

16. The vehicle system of claim 1, wherein the computer readable and executable instructions, when executed by the at least one processor, further cause the controller to:

change the ratio of the steered angle of the driving wheels to the rotation angle of the steering wheel from a first ratio to a second ratio in response to the instruction from the controller.

17. The vehicle system of claim 9, wherein the acceleration sensitivity adjusting unit changes the sensitivity of the accelerator pedal by adjusting the ratio of the opening amount of the throttle valve to the dislocation amount of the accelerator pedal from a first ratio to a second ratio in response to the instruction from the controller.

18. A method comprising: receiving an electronic signal associated with a rotation angle of a steering wheel of a vehicle;

outputting an electronic signal for steering driving wheels of the vehicle in response to the electronic signal associated with the rotation angle of the steering wheel;

detecting an object based on output from one or more sensors of the vehicle;

determining whether the vehicle is turning toward the object; and reducing a ratio of a steered angle of the driving wheels to the rotation angle of the steering wheel in response to determining that the vehicle is turning toward the object.

19. The method of claim 18, wherein reducing the ratio of the steered angle of the driving wheels to the rotation angle of the steering wheel in response to determining that the vehicle is turning toward the object comprises:

reducing the ratio of the steered angle of the driving wheels to the rotation angle of the steering wheel from a first ratio to a second ratio in response to determining that the vehicle is turning toward the object.

* * * * *

UNITED STATES PATENT AND TRADEMARK OFFICE
CERTIFICATE OF CORRECTION

PATENT NO. : 10,960,924 B2
APPLICATION NO. : 15/624769
DATED : March 30, 2021
INVENTOR(S) : Todd J. Rowell and Michael L. Elkins It is certified that error appears in the above-identified patent and that said Letters Patent is hereby corrected as shown below:

In the Claims

In Column 14, Line(s) 25, Claim 3, after "claim", delete "2" and insert --1--, therefor.

In Column 14, Line(s) 39, Claim 6, after "claim", delete "2" and insert --1--, therefor.

In Column 14, Line(s) 50, Claim 8, after "claim", delete "2" and insert --1--, therefor.

Signed and Sealed this
First Day of June, 2021

Drew Hirshfeld
*Performing the Functions and Duties of the
Under Secretary of Commerce for Intellectual Property and
Director of the United States Patent and Trademark Office*